United States Patent [19]
Paap

[11] 3,882,309
[45] May 6, 1975

[54] DUAL SCINTILLATION DETECTOR, SINGLE PHOTOMULTIPLIER DENSITY LOGGING SYSTEM

[75] Inventor: Hans J. Paap, Houston, Tex.
[73] Assignee: Texaco Inc., New York, N.Y.
[22] Filed: July 30, 1973
[21] Appl. No.: 383,942

[52] U.S. Cl............................. 250/264; 250/367
[51] Int. Cl............................................ G01t 1/20
[58] Field of Search .......... 250/264, 265, 266, 367; 328/104

[56] References Cited
UNITED STATES PATENTS

| | | | |
|---|---|---|---|
| 2,990,474 | 6/1961 | Scherbatskoy | 250/264 |
| 3,116,417 | 12/1963 | Orr et al. | 250/264 |
| 3,747,001 | 7/1973 | Fasching | 328/104 |

Primary Examiner—Harold A. Dixon
Attorney, Agent, or Firm—T. H. Whaley; C. G. Ries; William J. Beard

[57] ABSTRACT

An illustrative embodiment of the invention includes a gamma ray density logging system utilizing a well logging sonde having two longitudinally spaced scintillation type gamma ray detectors having different phosphor decay constant characteristics. The dual detectors are optically coupled by a high density lead glass pipe which also acts as a gamma ray shielding material. A single photomultiplier observes both scintillation crystals and transmits voltage pulses representative of scintillations from both crystals to the surface where they are separated by pulse shape discrimination techniques to produce a dual detector compensated density log.

11 Claims, 3 Drawing Figures

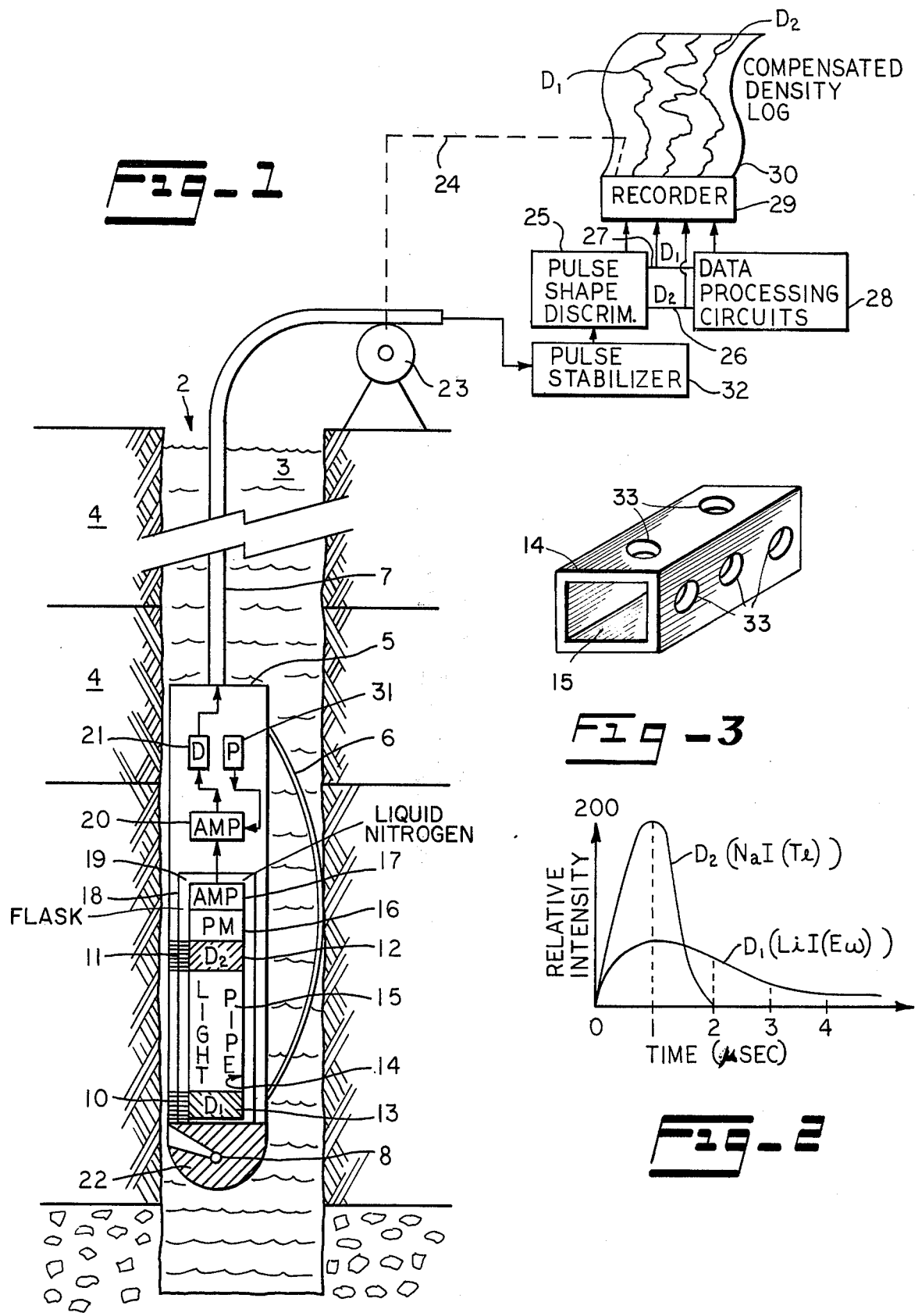

DUAL SCINTILLATION DETECTOR, SINGLE PHOTOMULTIPLIER DENSITY LOGGING SYSTEM

BACKGROUND OF THE INVENTION

This invention relates to well logging and more particularly to the density logging of earth formations in the vicinity of a well bore by measurements of scattered gamma rays.

It has long been known in the art that the density of earth formations in the vicinity of a borehole may be determined by emitting medium energy gamma rays from a radioactive source into the earth formations surrounding the borehole and measuring the number of gamma rays reflected or scattered from the earth formations into a detector spaced a longitudinal distance along the borehole from the radioactive source. The emitted gamma rays may be thought of as high velocity particles which collide and interact electromagnetically with the electrons of the atoms comprising the elements of the earth formations. In general each time a gamma ray collides with an electron, it can lose some, but not all, of its energy to the electron and continue (perhaps in a different direction) with a diminished energy. This type of interaction is known as Compton scattering. The number of Compton scattering collisions is related directly to the number of electrons in the formation. Consequently, the response of a gamma ray density logging tool is determined essentially by the electron density of the earth formations. This electron density is in turn related to bulk density of the earth formations which in turn depends upon the density of the rock matrix material, ther formation porosity, and the density of the fluids filling the pore spaces in the earth formation.

The thickness of mud cake deposited on the walls of the borehole by the drilling fluid and the characteristics of the drilling fluids in the borehole can all affect the response of a single detector formation density tool. In order to minimize these effects it has become practice in the prior art to provide density logging sondes with backup arms or devices to urge the face of the density logging tool against one wall of the borehole and to provide the logging tool with a skid or sharp edge to cut through the mud cake which is deposited by the drilling fluid along the interior surfaces of a wellbore. It has also been known in the prior art to provide dual gamma ray detectors spaced apart from each other and from the radioactive source along the axis of the borehole. By taking a ratio (or otherwise correcting) the gamma ray signals received from each of the two spaced detectors the effects of the borehole fluid and mud cake on the scattered gamma rays can be lessened or minimized.

Even with all these corrective factors applied to formation density tools, accurate and repeatable formation density measurements are not always possible. For example, one problem which arises in the use of a dual detector density logging tool can arise due to the fact that two different photomultiplier tubes may be required to observe two scintillation crystals comprising the dual detector system. The response of the two photomultiplier tubes may not be precisely the same and this can introduce nonlinearities into the response of the tool when plotting the short spacing detector counting rate versus the long spacing detector counting rate.

Typically, in the prior art a given density logging tool is calibrated in test pit earth formations having mud cake of known characteristics and formations of known characteristics. The tool is then typically recalibrated at the well site before and after the density log is performed in the well bore in order to insure that the tool response remains consistent with its previous calibration history.

Another undesirable restriction is placed on a density logging tool having dual detectors and using dual photomultipliers to observe the two detector crystals is that the physical size of the photomultiplier tubes used to monitor the crystals places a limit on the closeness with which the detector cyrstals can be mounted. In particularly irregular boreholes this distance may be inconveniently far apart and the length restriction required placed on the tool by this requirement can prevent the tool from being urged against the borehole wall as it traverses the borehole on a logging run. Other requirements in density logging can also make a density logging tool with dual detectors spaced closer together than the size limitation placed on their spacing by a photomultiplier tube desirable. It may be shown for example that the effective depth of investigation of a density logging tool having dual detectors is proportional to the detectors differential spacing or spacing from each other. If it is desired to construct a density logging tool having a very shallow depth of investigation (for example, to detect the invasion characteristics of the formation), this would be rendered extremely difficult using conventional dual detector density tools having separate photomultiplier tubes for observing each of the detector crystals.

Accordingly, it is an object of the present invention to provide a density logging tool which would permit the use of dual scintillation detectors mounted closer together than has heretofore been accomplished in the art.

Another object of the invention is to provide a dual detector density logging tool utilizing only a single photomultiplier tube to observe both of the scintillation detectors.

A still further object of the present invention is to provide a dual scintillation detector density logging tool utilizing a single photomultiplier tube to observe both scintillation detectors and providing separation of the detector signals by means of pulse shaped discrimination.

BRIEF DESCRIPTION OF THE INVENTION

Briefly, the above and other objects and advantages of the present invention are provided in a gamma ray density logging tool having two scintillation detectors comprised of different types of scintillating materials having widely variant phosphorescent response characteristics. The two scintillating crystals are spaced apart any desired distance and are separated by an optically transparent light pipe material having a high density and useful as a gamma ray shielding material between the two detectors. The photomultiplier tube is mounted adjacent the far spaced (from the source) detector crystal (which is also optically transparent) and observes the detector crystal closest to it directly and the far spaced detector through the close spaced detector and the optical light pipe. Because of the widely varying phosphorescent response characteristics of the two different detector crystals the photomultiplier tube produces significantly different shaped voltage pulses for scintillations caused by gamma rays reaching the two different spaced detectors. All pulses produced by the photomultiplier tube are transmitted to the surface via the well logging cable. At the surface pulses from the different detector crystals are discriminated from each other by a pulse shape discriminator apparatus. The separated detector signals are plotted as a function of borehole depth together with a formation compensated density log which may be derived by known techniques.

The invention is pointed out with particularity in the appended claims. The objects and features of the invention are best understood by reference to the following detailed description thereof when taken in conjunction with the accompanying drawings in which:

BRIEF DESCRIPTION OF THE DRAWINGS

FIG. 1 is a schematic diagram illustrating a dual detector gamma ray density logging system in accordance with the concepts of the invention.

FIG. 2 is a graphical representation illustrating pulses produced by the photomultiplier tube when observing the dual scintillation detectors used in the present invention.

FIG. 3 is a detail perspective view of light pipe 15 of FIG. 1.

DESCRIPTION OF THE PREFERRED EMBODIMENT

Referring initially to FIG. 1, a well logging system in accordance with the concepts of the present invention is shown schematically. A well borehole 2 is shown penetrating earth formations 4 and is filled with a drilling fluid 3. A well logging sonde 5 comprising a body member which is urged against the wall of the borehole 2 by backup arm 6 is shown suspended in the borehole 2 by an armored well logging cable 7 of a type known in the art. The well logging sonde 5 is moved vertically through the borehole 2 by a conventional winch arrangement (not shown) and a sheave wheel 23. The sheave wheel 23 may be either electrically or mechanically coupled to a well logging recorder 29 as indicated by the dotted line 24 so that the record medium 30 may be moved as a function of borehole depth. In this manner quantities derived from measurements made in the well logging sonde 5 may be recorded as a function of borehole depth in this manner.

Basically the downhole sonde 5 may be seen to be comprised at its lower end of a radioactive source 8 which may be in encapsulated mixture of a medium energy gamma ray emitting substance such as cobalt 60. The radioactive source 8 is surrounded by a shielding material 22 such as lead, tungsten, or the like to prevent direct irradiation of the detectors. The shielding material 22 is provided with a collimation opening 9 in such a manner that the gamma rays emitted from the radioactive source 8 are directed into the earth formations 4 adjacent the well bore 2 in a preferred direction. The elongated hollow body member 5 of the sonde is provided on its interior portion with a dewar flask 18 which may be filled with liquid nitrogen 19 or some other refrigerating material. Thus, the apparatus within the dewar flask 18 is maintained at a relatively cold temperature to insure proper performance of the detectors and the electronic apparatus contained therein.

Interior to the dewar flask 18 are situated two longitudinally spaced gamma ray detectors 12 and 13. The characteristics of these two detectors will be described in more detail subsequently. An optically transparent light pipe 15 is provided to optically couple two detectors 12 and 13 to each other and to a photomultiplier tube 16 which may be of conventional design. Scattered gamma rays from the earth formations 4 surrounding the well bore are directed to the two detectors 12 and 13 by collimating appertures 10 and 11. These collimating appertures together with the shielding characteristics of the light pipe 15 insure that the two gamma ray scintillation detectors 12 and 13 "see" only the portion of the earth formations directly opposite their positions in the well logging sonde 5.

As is well known in the art, the scintillating crystals 12 and 13 emit a flash of light each time a gamma ray scattered from the earth formations 4 in the vicinity of the borehole enters one of them via the collimating appertures 10 and 11. These light flashes or scintillations are sensed by the optically coupled photomultiplier tube 16 which produces a voltage pulse corresponding in height to the intensity of each of the scintillations. These voltage pulses are amplified by a preamplifier 17 which is also contained in the dewar flask 18. The amplified electrical pulses from the preamplifier 17 are supplied to an amplifier stage 20 and from thence to a cable driver circuit 21 which may be of conventional design. A reference pulser 31, situated in the downhole sonde 5, also provides periodic voltage pulses of a known amplitude to the amplifier stage 20. These known amplitude voltage pulses are transmitted to the surface via well logging cable 7 where they are used to maintain system gain linearity by a pulse stabilizing circuit 32. The pulse stabilizing circuit 32 and reference pulser 31 may be of the type described in copending U.S. Pat. Application Ser. No. 82,028 filed Oct. 19, 1970 now abandoned which is assigned to the assignee of the present invention. The cable driver circuit 21 and amplifier 20 perform amplification for transmission to the surface of these voltage pulses via the well logging cable 7 conductors.

Although not depicted in FIG. 1, it will be understood by those skilled in the art that the electrical circuits of the present invention may be supplied with operating power from a surface electrical generator (not shown) by means of the cable conductors and power supplies (not shown) situated in the downhole tool in a conventional manner.

Materials which may be utilized for scintillation detectors 12 and 13 may be chosen from combinations given in the following table:

TABLE I

| FIG. 1 Detector | Material | Decay Constant Sec. | Density | Relative Pulse Height |
|---|---|---|---|---|
| $D_1$ | NaI(Tl) | 0.25 | 3.57 | 210 |
| $D_2$ | LiI(Eu) | 1.40 | 4.06 | 74 |
| $D_1$ | NaI(Tl) | 0.25 | 3.57 | 210 |
| $D_2$ | CsI(Tl) or | 1.10 | 4.51 | 55 |
|  | CsI(Na) | 1.10 | 4.51 | 55 |
| $D_1$ | NaI(Tl) cr | 0.25 | 3.57 | 210 |
|  | LiI(Eu) or | 1.40 | 4.06 | 74 |
|  | CsI(Tl) | 1.10 | 4.51 | 55 |

TABLE I-Continued

| FIG. 1 Detector | Material | Decay Constant Sec. | Density | Relative Pulse Height |
|---|---|---|---|---|
| | or CsI(Na) | 1.10 | 4.51 | 55 |
| $D_2$ | Plastic Scintillator | .003 to .005 | 1.06 | 28 to 48 |

In the example shown in Table I it is contemplated that detector 13 which is nearer the source is comprised of a europium activated lithium iodide cyrstal. Detector 12 which is farther from the gamma ray source is contemplated in the example of FIG. 1 to comprise a thallium activated sodium iodide crystal. It will be appreciated that other combinations of detectors could be used than those disclosed in Table I, so long as the decay constants of the scintillating material are quite different so that when the voltage pulses representative of the scintillations occuring the the two different detector crystals are transmitted to the surface, pulse shape discrimination techniques may be used to separate them.

Referring now to FIG. 2, typical response curves for detectors 12 and 13 of FIG. 1 are illustrated to show the difference of the electrical pulse shapes generated from the photomultiplier 16 by the differing scintillating materials. The decay constant of the europium activated lithium iodide crystal is seen from Table I to be approximately 1.4 microseconds. This detector 13 thus produces a relatively lower amplitude and longer duration pulse from the photomultiplier tube than that produced by the thallium activated sodium iodide crystal, having a decay constant of 0.25 microseconds, which is used for detector 12 of FIG. 1. The markedly different pulse shapes produced by each scintillation from these two differing scintillation detectors are operated upon by pulse shape discriminator apparatus 25 at the surface to separate the pulses from the two detectors. The pulse shape discriminator circuit 25 could comprise, for example, the Model MC-25 Pulse Shape Analyzer produced by the Harshaw Chemical Company (Crystal and Electronics Product Department) located at Solon, Ohio. Alternately, pulse shape discrimination techniques and circuitry such as those described in U.S. Pat. No. 3,510,654 which is assigned to the assignee of the present invention could be used for this purpose.

In either case, the pulse shape discriminator circuitry 25 produces output via lines 26 and 27 for each scintillation occuring in the two spatially separated scintillation detectors 12 and 13 located in the subsurface portion of the well logging system of the invention. These two signals may be recorded directly by the recorder 29 as indicated in FIG. 1 or may be processed further by data processing circuits 28 in order to produce a direct recording of the compensated density of the earth formations in the vicinity of the well bore. In the case where it is desired to use computed compensation, the data processing circuits 28 can comprise formation density compensation circuits such as those disclosed in U.S. Pat. No. 3,701,902 or other similar techniques known in the art.

Referring now to FIG. 3 the light pipe 15 of FIG. 1 which connects the two scintillating crystals optically is shown. This pipe is provided on its outer surface 14 with a coating of reflecting material to prevent loss of light being transmitted through the optical material comprising the light pipe 15. The light pipe 15 may be a high density lead glass (Hi-D) such as that described in the Reactor Handbook published by the United States Atomic Commission, March 1955, AECD-3645, Volume I. This book shows that the density of this high density lead glass material is about 6.4 grams per cubic centimeter and that it possesses gamma ray shielding characteristics comparable to that of iron. The high density lead glass comprising light pipe 15 contains about 81% by weight of lead and has a refraction index of approximately 1.96. In the case where light outputs are vastly different from the two scintillator materials chosen, the light output as seen by the photomultiplier device 16 can be more nearly equalized or matched by introducing intentional light losses in the light pipe such as apertures or gaps 33 in the reflective coating on the surface 14.

Since the gamma ray flux is lowest at the detector 12 which is farthest from the radioactive source 8, the detector 12 should have the higher efficiency of the two different scintillation detector crystals chosen for usage in the well logging system. Also, since some optical attenuation may be expected in the light pipe 15, it is advantageous to select the scintillating material with the relatively higher pulse height or light output for use as the nearer to the source detector 13. Neither of these two conditions are mandatory, however, and the combinations of detector materials listed in Table I are all suitable for the well logging technique disclosed in the present invention.

The foregoing description may make other alternative embodiments of the invention apparent to those skilled in the art. It is therefore the aim in the appended claims to cover all such changes and modifications as fall within the true spirit and scope of the invention.

I claim:

1. A gamma ray density well logging system comprising:

a fluid tight hollow sonde sized and adapted for passage in a well borehole and having disposed therein a source of medium energy gamma rays and means for selectively irradiating preferred portions of earth formations in the vicinity of a well borehole with said gamma rays, first scintillation detector means longitudinally spaced from said source and having first phosphorescent decay characteristics, second scintillation detector means longitudinally spaced from said source and said first scintillation detector means and having second, substantially different phosphorescent decay characteristics, means situated between said detector means for optically coupling said first and second scintillation detector means and effectively shielding said detectors from each other with respect to gamma radiations, means optically coupled to said first and second scintillation detectors for generating first and second voltage pulses in response to scintillations occurring in said first and second detectors, said first and second voltage pulses having substantially different shape characteristics due to the difference in said first and second phosphorescent decay characteristics, means for transmitting said voltage pulses from said sonde to the surface of the earth and means for separating said first and second voltage pulses from each other on the basis of their substantially different shape characteristics.

2. The system of claim 1 and further including gamma ray collimating means, disposed adjacent said first and second detectors in said sonde for allowing essentially only gamma rays scattered from those portions of the earth formations directly opposite said first and second detectors to impinge on said detectors.

3. The system of claim 1 and further including means disposed in said sonde for maintaining said first and second scintillation detectors and said means for generating first and second voltage pulses in response to scintillations occurring in said first and second scintillation detectors at a temperature less than the freezing point of water while said sonde traverses a well borehole.

4. The apparatus of claim 3 wherein said temperature maintaining means comprises a dewar flask housing said scintillation detectors and said voltage pulse generating means and containing a refrigerant such as liquid nitrogen.

5. The system of claim 1 wherein said means for optically coupling said first and second scintillation detectors while effectively shielding said detectors from each other with respect to gamma radiation comprises generally a prism shaped parallelpiped made of high density lead glass and having its exterior sides, but not its ends, coated with an optically reflective material, said ends being disposed immediately adjacent said first and second scintillation detectors respectively.

6. The system of claim 1 wherein said first scintillation detector comprises an europium activated lithium iodide detector and said second scintillation detector comprises a thallium activated sodium iodide detector.

7. The system of claim 1 wherein said first scintillation detector comprises a thallium activated sodium iodide detector and said second scintillation detector comprises a sodium or thallium activated cesium iodide detector.

8. The system of claim 1 wherein said first scintillation detector comprises an europium activated lithium iodide detector and said second scintillation detector comprises an organic plastic scintillator.

9. The system of claim 1 wherein said first scintillation detector comprises a sodium or thallium activated cesium iodide detector and said second scintillation detector comprises an organic plastic scintillator.

10. The system of claim 1 wherein said first scintillation detector comprises a thallium activated sodium iodide detector and said second scintillation detector comprises an organic plastic scintillator.

11. The system of claim 1 and further including means in said optical coupling means for approximately equalizing the amount of light reaching said voltage pulse generating means from said first and second scintillation detectors.

* * * * *